US006502101B1

(12) United States Patent
Verprauskus et al.

(10) Patent No.: US 6,502,101 B1
(45) Date of Patent: Dec. 31, 2002

(54) CONVERTING A HIERARCHICAL DATA STRUCTURE INTO A FLAT DATA STRUCTURE

(75) Inventors: Andy Verprauskus, Seattle, WA (US); Jason Allen, Sammamish, WA (US); Jason Cahill, Cornation, WA (US)

(73) Assignee: Microsoft Corporation, Redmond, WA (US)

( * ) Notice: Subject to any disclaimer, the term of this patent is extended or adjusted under 35 U.S.C. 154(b) by 123 days.

(21) Appl. No.: 09/615,905

(22) Filed: Jul. 13, 2000

(51) Int. Cl.[7] .............................................. G06F 17/30
(52) U.S. Cl. ...................... 707/101; 707/100; 707/102; 707/104; 707/6
(58) Field of Search ............................ 707/2, 3, 4, 100, 707/1, 102, 101, 104, 200, 533, 7, 6; 716/8, 10; 382/240

(56) References Cited

U.S. PATENT DOCUMENTS

| | | | | |
|---|---|---|---|---|
| 4,555,771 A | * | 11/1985 | Hayashi ........................ | 707/1 |
| 5,295,261 A | * | 3/1994 | Simonetti .................... | 707/101 |
| 5,438,511 A | * | 8/1995 | Maxwell et al. ............... | 704/1 |
| 6,263,332 B1 | * | 7/2001 | Nasr et al. ............... | 707/104.1 |
| 6,424,979 B1 | * | 7/2002 | Livingston et al. ......... | 707/203 |

OTHER PUBLICATIONS

Bohannon et al., "From XML Schema to relations: A cost-based approach to XML Storage", IEEE, 2002.*
Chow et al., "Index Design for structured documents based on abstaction", IEEE, Feb. 1992.*
Su et al., "XEM: Managing the evolution of XML document", IEEE, pp. 103–110.*

* cited by examiner

Primary Examiner—Jean M. Corrielus
(74) Attorney, Agent, or Firm—Merchant & Gould; Alton Hornsby, III

(57) ABSTRACT

Upon receipt of the hierarchical data structure, a shape tree is constructed corresponding to the hierarchical data structure. The shape tree is an intermediate data structure containing only one unique node for each element of the hierarchical data structure. After the shape tree is constructed, it is annotated with properties describing the hierarchical relationships between elements of the hierarchical data structure. The annotated shape tree is used to create the structure of the flat data structure. Once the shape tree is annotated, the column names for the flat data structure are built utilizing the annotated shape tree. With the column names built, data is emitted from the hierarchical data structure into the proper columns and rows of the flat data structure.

18 Claims, 10 Drawing Sheets

INPUT XML FILE

137

| | | | |
|---|---|---|---|
| < A > | | | -705 |
| | < B > b 1 </ B > | | -710 |
| | < B > b 2 </ B > | | -715 |
| | < B > b 3 </ B > | | -720 |
| | < C > | | -725 |
| | | < D > d 1 </ D > | -730 |
| | | < D > d 2 </ D > | -735 |
| | | < E > e </ E > | -740 |
| | </ C > | | -745 |
| | < F > 7.95 </ F > | | -750 |
| | < C > | | -755 |
| | | < D > d 3 </ D > | -760 |
| | </ C > | | -765 |
| </ A > | | | -770 |

FIG.7

FLAT DATA STRUCTURE

| | /A/B/#text | /A/C/#id | /A/C/D/#text | /A/C/E/#text | /A/F/#num | /A/F/#agg |
|---|---|---|---|---|---|---|
| 1005... | | | | | | 7.95 |
| 1010... | b 1 | | | | 7.95 | |
| 1015... | b 2 | | | | 7.95 | |
| 1020... | b 3 | | | | 7.95 | |
| 1025... | | 1 | d1 | e | 7.95 | |
| 1030... | | 1 | d2 | e | 7.95 | |
| 1035... | | 2 | d3 | | | |

FIG.10

CONVERTING A HIERARCHICAL DATA STRUCTURE INTO A FLAT DATA STRUCTURE

TECHNICAL FIELD

The present invention relates generally to the conversion of highly hierarchical data structures into less hierarchical data structures. More particularly, the present invention relates to receiving an input file in a standard format and converting it into a flat table data structure.

BACKGROUND OF THE INVENTION

Historically large database users utilized database management programs written for specific applications with little thought to standardization. Through the years as more and more data was added, the databases resulting from these database management programs grew larger and larger and have become known as legacy systems. As the organizations utilizing these large proprietary databases became more automated and computerized, the need to share data between departments, functions, subsidiaries and sister organizations became more and more prevalent. Due to this need, a standard database formats were developed.

One such standard format developed is XML. XML is a very hierarchical data base format, which includes a multitude of data structures which in turn contain data sub-structures, which in turn may contain data sub-substructures. Due to the advent of this standard database format, many computer users have converted the aforementioned proprietary legacy database systems to the standard XML database format.

Along with the advent of the personal computer on the modern business landscape came many useful application programs including those utilizing electronic spreadsheets. Electronic spreadsheets typically operate on data contained in a matrix of cells comprising columns and rows. Generally, this data format is contained in a single table and is a very flat data structure in that the data is not maintained in a hierarchical data structure utilized by XML.

With the ease of availability of the personal computer, many users have become proficient in their use and more specifically, in using electronic spreadsheet application programs. While the electronic spreadsheets offer many advantages over prior conventional means, they utilizes a flat data structure. With huge amounts of data stored in hierarchical formats such as XML, the electronic spreadsheet with its flat data structure had no means to access this wealth of data thus a means for accessing it with a spreadsheet has become desirable. While other programs have parsed data contained in the XML format, none have converted XML formatted data into a flat data structure suitable for the use by an electronic spreadsheet.

Therefore, there remains a need in the art for a method for converting a database structure that is arbitrarily hierarchical into a flat data structure. This flat data structure should be suitable for use in electronic spreadsheet tables.

SUMMARY OF THE INVENTION

The present invention fulfills the need in the art for converting a database structure that is arbitrarily hierarchical into a flat data structure suitable for use in electronic spreadsheet tables.

In accordance with one aspect of the present invention, a system and method are provided for converting a hierarchical data structure into a flat data structure. The format of the hierarchical data structure may be XML.

First, the hierarchical data structure is converted into an input data tree comprising nodes. These nodes contain the data elements of the hierarchical data structure and are linked together in a parent-child relationship. This parent-child relationship is derived from the hierarchical data structure.

Next, a shape tree is constructed corresponding to the input data tree by collapsing nodes of the input data tree containing redundant elements into one node. Once the shape tree is constructed, it is then annotated with properties describing the hierarchical relationships between elements of the input data tree. These properties may include, 1) a first property specifying the maximum number of times a given element appears inside its parent across the entire input tree, 2) a second property set equal to false if and only if the node's first property is greater than zero or if the node has any child nodes and anyone of said child nodes have a second property set to false, and 3) a third property set to true if every occurrence of the element corresponding to the node contains numeric data.

Finally, a list of column names are built for the flat data structure deriving the column names by tracing the shape tree. Once the column names are built, the data is emitted from the input data tree into proper columns and row of the flat data structure. The flat data structure may be readily usable by an electronic spreadsheet.

BRIEF DESCRIPTION OF THE DRAWINGS

FIG. 7 is an abstract representation of the input XML file of an exemplary embodiment of the present invention;

FIG. 10 is an abstract representation of the flat data structure of an exemplary embodiment of the present invention.

DETAILED DESCRIPTION OF THE EXEMPLARY EMBODIMENTS

The present invention is directed to a system and method for flattening an XML data input file. In one embodiment, the present invention is incorporated into the "OFFICE" suite of application programs that is marketed by Microsoft Corporation of Redmond, Wash. Briefly described, the invention provides for receiving a data file formatted in hierarchical data structure. An example of such a format could include XML, however those skilled in the will appreciate that many other database structures are highly hierarchical.

Upon receipt of the hierarchical data structure, a shape tree is constructed corresponding to the hierarchical data structure. The shape tree is an intermediate data structure containing only one unique node for each element of the hierarchical data structure. After the shape tree is constructed, it is annotated with properties describing the hierarchical relationships between elements of the hierarchical data structure. The annotated shape tree is used to create the structure of the flat data structure.

Once the shape tree is annotated, the column names for the flat data structure are built utilizing the annotated shape tree. With the column names built, data is emitted from the hierarchical data structure into the proper columns and rows of the flat data structure.

Figure 1:
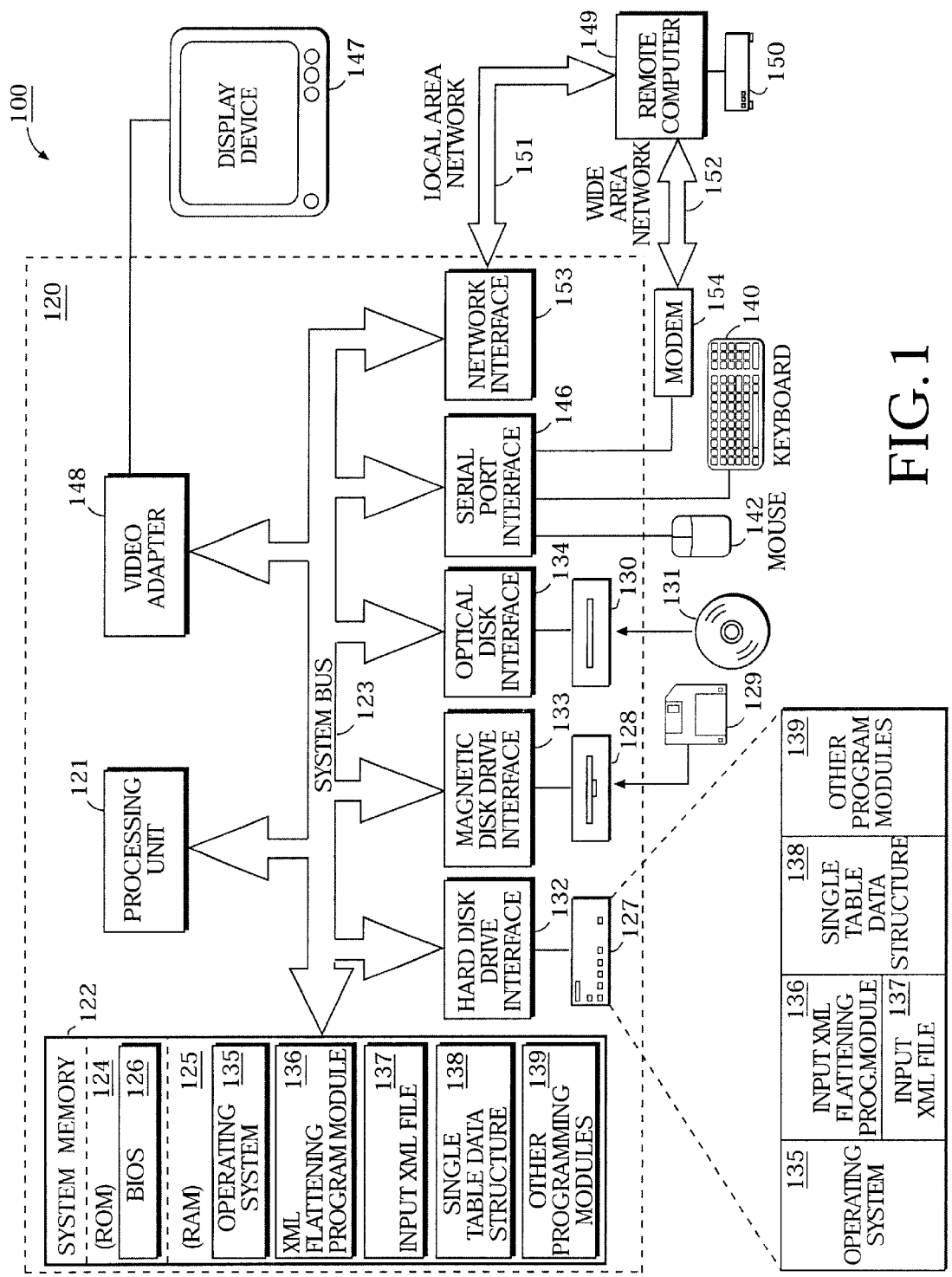
FIG. 1 is a functional block diagram of a computer system in an exemplary operating environment for the exemplary embodiments of the invention.

The description of the exemplary embodiment of the present invention will hereinafter refer to the drawings, in which like numerals indicate like elements throughout the several figures. Beginning with FIG. 1, an exemplary operating environment for implementation of an exemplary embodiment of the present invention is shown. Within the exemplary operating environment, the present invention may operate to facilitate the flatten of an XML data structure into a flat data structure. However, those skilled in the art should appreciate that the invention may be practiced in any type of computer operating environment such as hand-held devices, multiprocessor systems, microprocessor-based or programmable consumer electronics, minicomputers, mainframe computers, and the like. The invention may also be practiced in distributed computing environments where tasks are performed by remote processing devices.

The exemplary embodiment of the present invention will be described in the general context of a XML flattening program module 136 which receives data from an input XML file 137 and convert it to a flat data structure 138. Those skilled in the art will recognize that the invention may be implemented in combination with various other program modules 139. Generally, program modules include routines, programs, components, data structures, etc. that perform particular tasks or implement particular abstract data types. Moreover, those skilled in the art will appreciate that the invention may be practiced with computer system configurations other than the one shown, that are linked through a communications network. In a distributed computing environment, program modules may be located in both local and remote memory storage devices.

An exemplary operating environment 100 for implementing the invention includes a conventional personal computer system 120, including a processing unit 121, a system memory 122, and a system bus 123 that couples the system memory 122 to the processing unit 121. The system memory 122 includes read only memory (ROM) 124 and random access memory (RAM) 125. A basic input/output system 126 (BIOS), containing the basic routines that help to transfer information between elements within the personal computer system 120, such as during startup, is stored in ROM 124.

The personal computer system 120 further includes a hard disk drive 127, a magnetic disk drive 128, e.g., to read from or write to a removable disk 129, and an optical disk drive 130, e.g., for reading a CD-ROM disk 131 or to read from or write to other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage for the personal computer system 120. For example, the input data text file 137 may be stored in the RAM 125 of hard disk 127 of the personal computer 120. Although the description of computer-readable media above refers to a hard disk, a removable magnetic disk and a CD-ROM disk, it should be appreciated by those skilled in the art that other types of media that are readable by a computer system, such as magnetic cassettes, flash memory cards, digital video disks, Bernoulli cartridges, and the like, may also be used in the exemplary operating environment.

A number of program modules and data files may be stored in the drives and RAM 125, including an operating system 135, an XML flattening program module 136, an input XML file 137, and a flat data structure 138. In particular, the XML flattening program module 136 which facilitates the flattening process, interacts with the input XML file 137 to produce the flat data structure 138. An exemplary embodiment of the XML flattening program module 136 will be described in detail with reference to FIG. 2.

Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a game port or a universal serial bus (USB). A display device 147 or other type of device such as a monitor is also connected to the system bus 123 via an interface, such as a video adapter 148. In addition to the monitor, personal computer systems typically include other peripheral output devices (not shown), such as speakers or printers.

The personal computer system 120 may operate in a networked environment using logical connections to one or more remote computer systems, such as a remote computer system 149. The remote computer system 149 may be a server, a router, a peer device or other common network node, and typically includes many or all of the elements described relative to the personal computer system 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, the personal computer system 120 is connected to the LAN 151 through a network interface 153. When used in a WAN networking environment, the personal computer system 120 typically includes a modem 154 or other means for establishing communications over the WAN 152, such as the Internet. The modem 154, which may be internal or external, is connected to the system bus 123 via the serial port interface 146. In a networked environment, program modules depicted relative to the personal computer system 120, or portions thereof, may be stored in the remote memory storage device 150. It will be appreciated that the network connections shown are exemplary and other means of establishing a communications link between the computer systems may be used. It will be further appreciated that the invention could equivalently be implemented on host or server computer systems other than personal computer systems, and could equivalently be transmitted to the host computer system by means other than a CD-ROM, for example, by way of the network connection interface 153.

Notwithstanding the broad applicability of the principles of the present invention, it should be understood that the configuration of the exemplary embodiment as an XML flattening program module 136 for widely-used personal computer systems 120 provides significant advantages. In particular, the XML flattening program module 136, comprising computer-implemented instructions for performing the method of the present invention, described in this specification, is specifically designed to exhibit acceptable memory-use and performance characteristics when implemented on the conventional personal computer system 120. In so configuring the MXL flattening program module 136, certain trade-off balances, particularly between the often conflicting goals of minimizing memory storage and increasing performance speed, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

Figure 2:
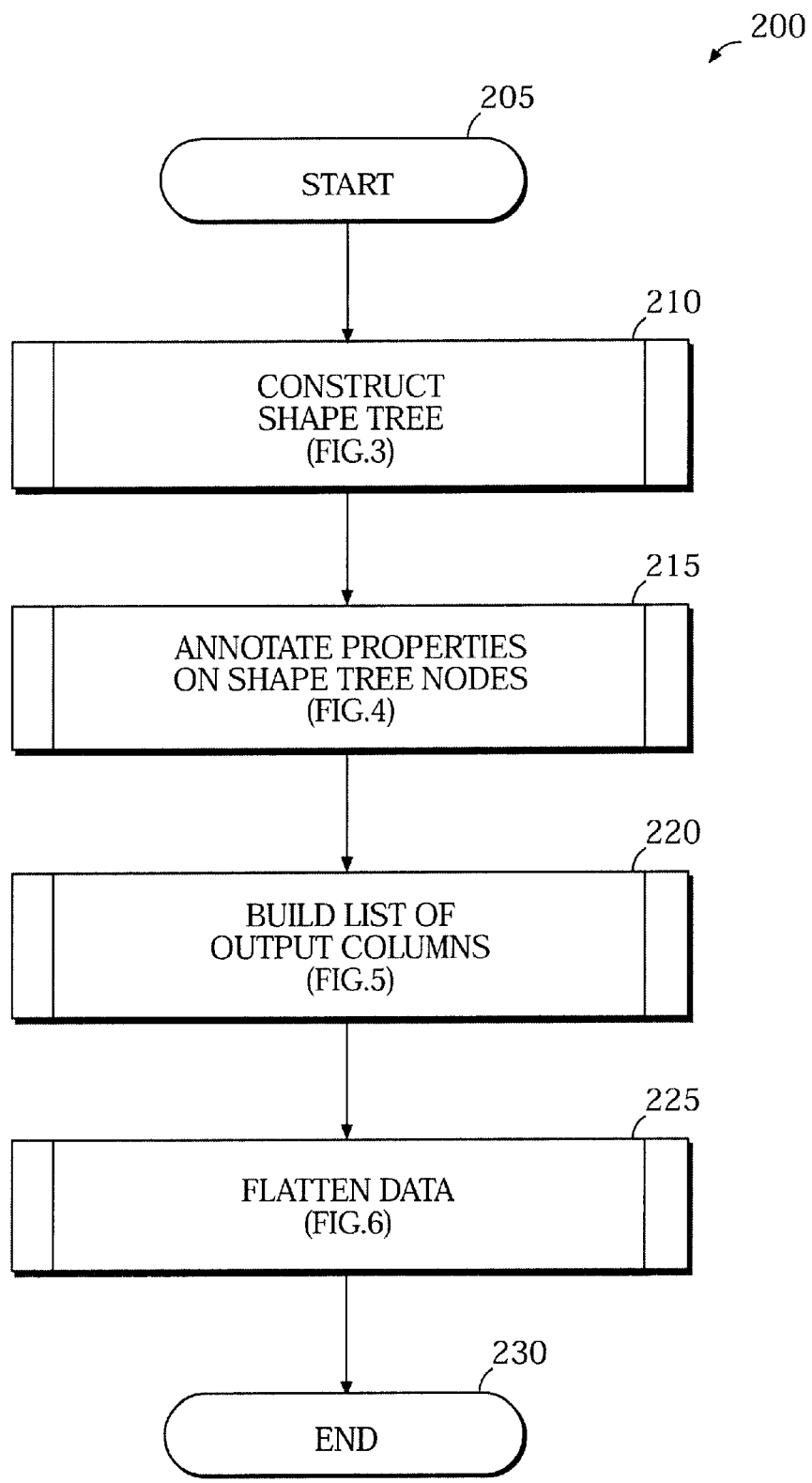
FIG. 2 is a flow chart that illustrates the general operation of an exemplary embodiment of the present invention.

FIG. 2 is a flow chart setting forth the steps involved in a method for converting a hierarchical data structure into a flat data structure. The exemplary method 200 is an overview of a typical hierarchical data structure flattening process. The implementation of the steps of method 200 in accordance with an exemplary embodiment of the present invention will be described in greater detail in FIG. 3 through FIG. 6.

Figure 3:
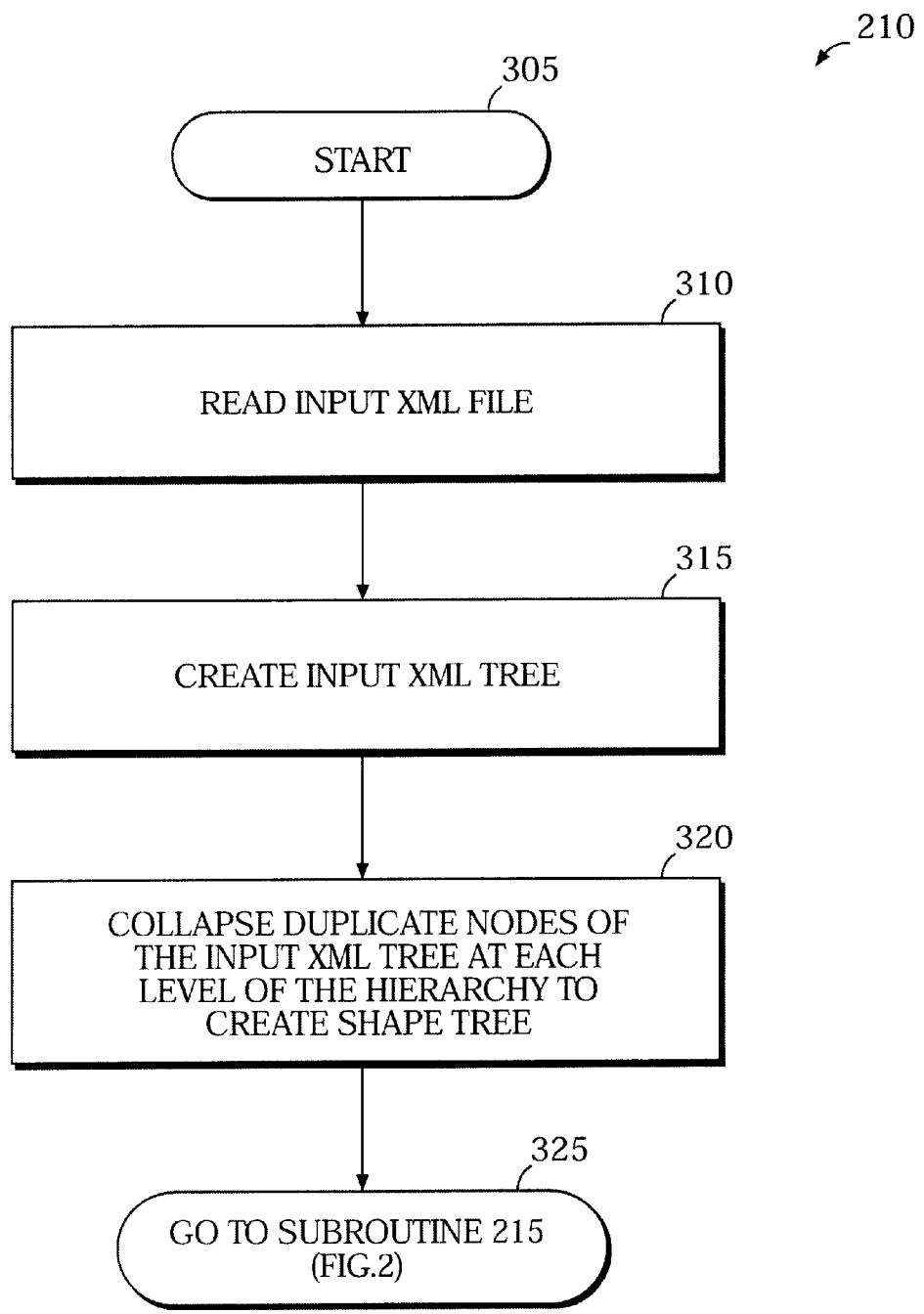
FIG. 3 is a flow chart that illustrates the construction of the shape tree utilized in the exemplary embodiment of the present invention.
Figure 4:
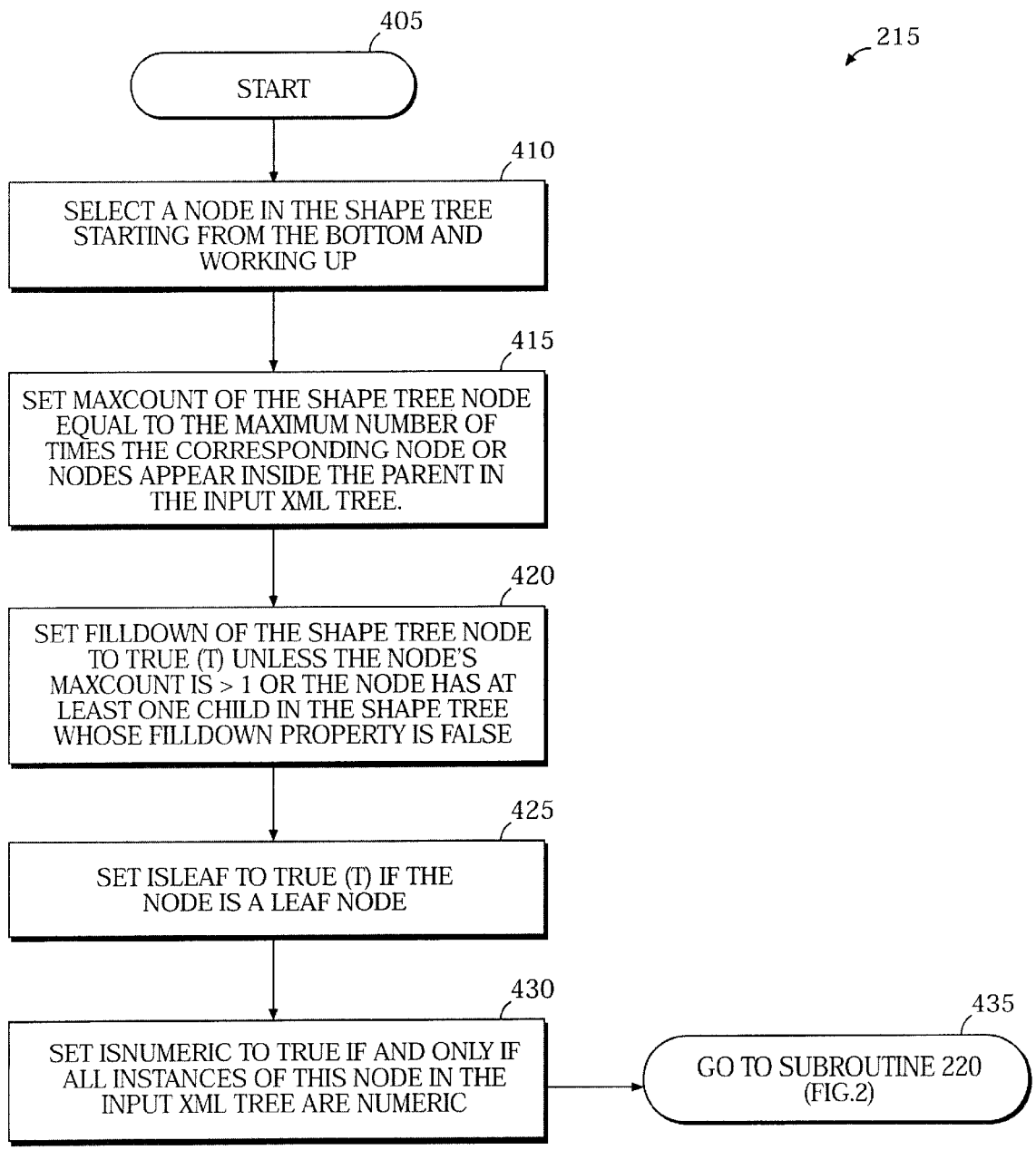
FIG. 4 is a flow chart that illustrates the annotation of properties on the shape tree utilized in the exemplary embodiment of the present invention.
Figure 5:
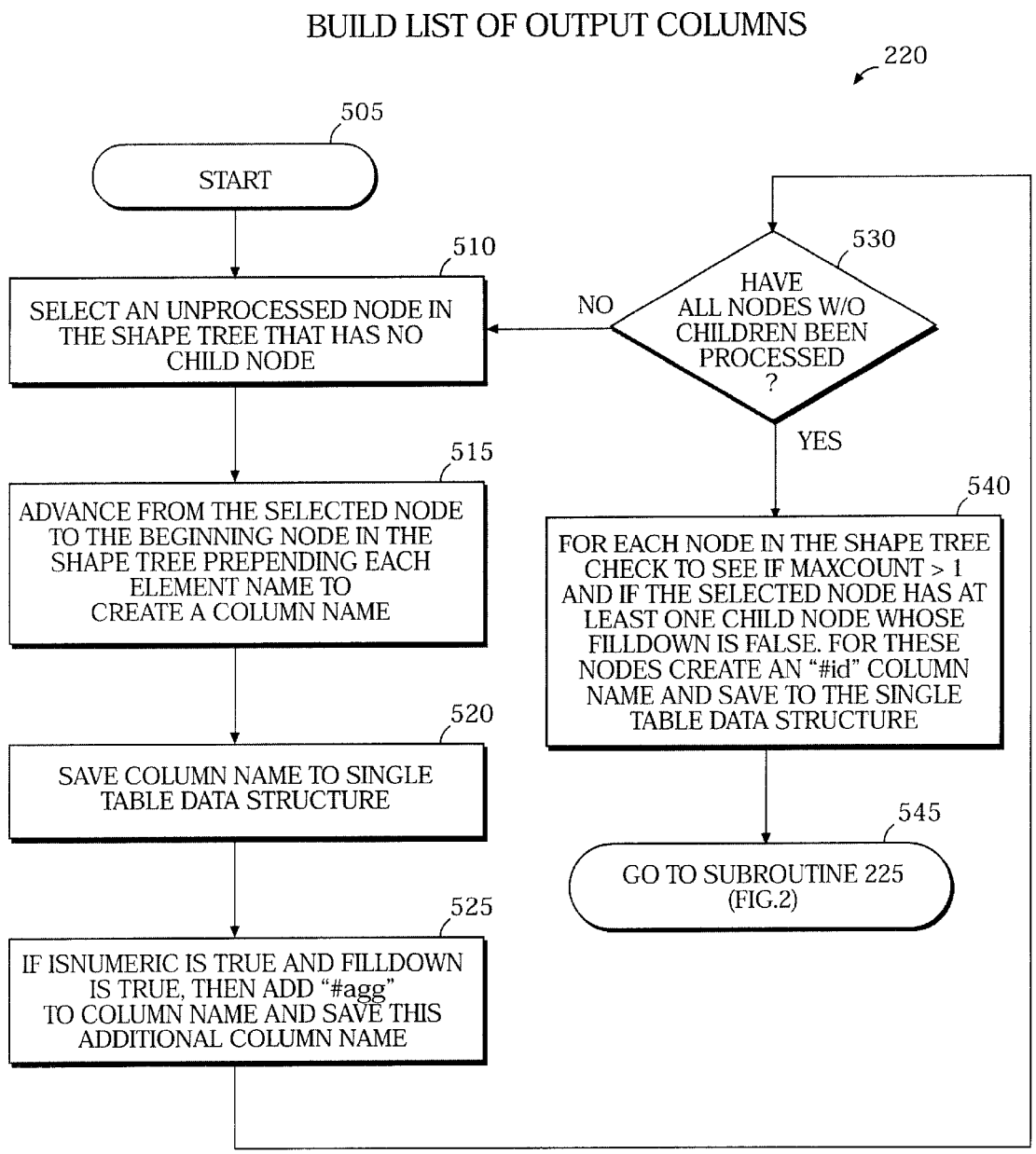
FIG. 5 is a flow chart that illustrates the building of the output columns utilized in the exemplary embodiment of the present invention.

Exemplary method 200 begins at starting block 205 and proceeds to subroutine 210 where the shape tree of the input XML file 137 is constructed. The shape tree is built and annotated in order to record the structure of the input XML file 137 so that the data contained in the input XML file 137 can be placed in the flat data structure properly. The steps comprising subroutine 210 are shown in FIG. 3 and will be described in greater detail below. Next, the method proceeds to subroutine 215 where the shape tree constructed in subroutine 210 is annotated with properties. These annotations provide information about the structure of the input XML file 137. The steps of subroutine 215 are shown in FIG. 4 and will be described in greater detail below. The method continues to subroutine 220 where a list of output column names for the flat data structure 138 are built. The steps of subroutine 220 are shown in FIG. 5 and will be described in greater detail below.

Figure 6:
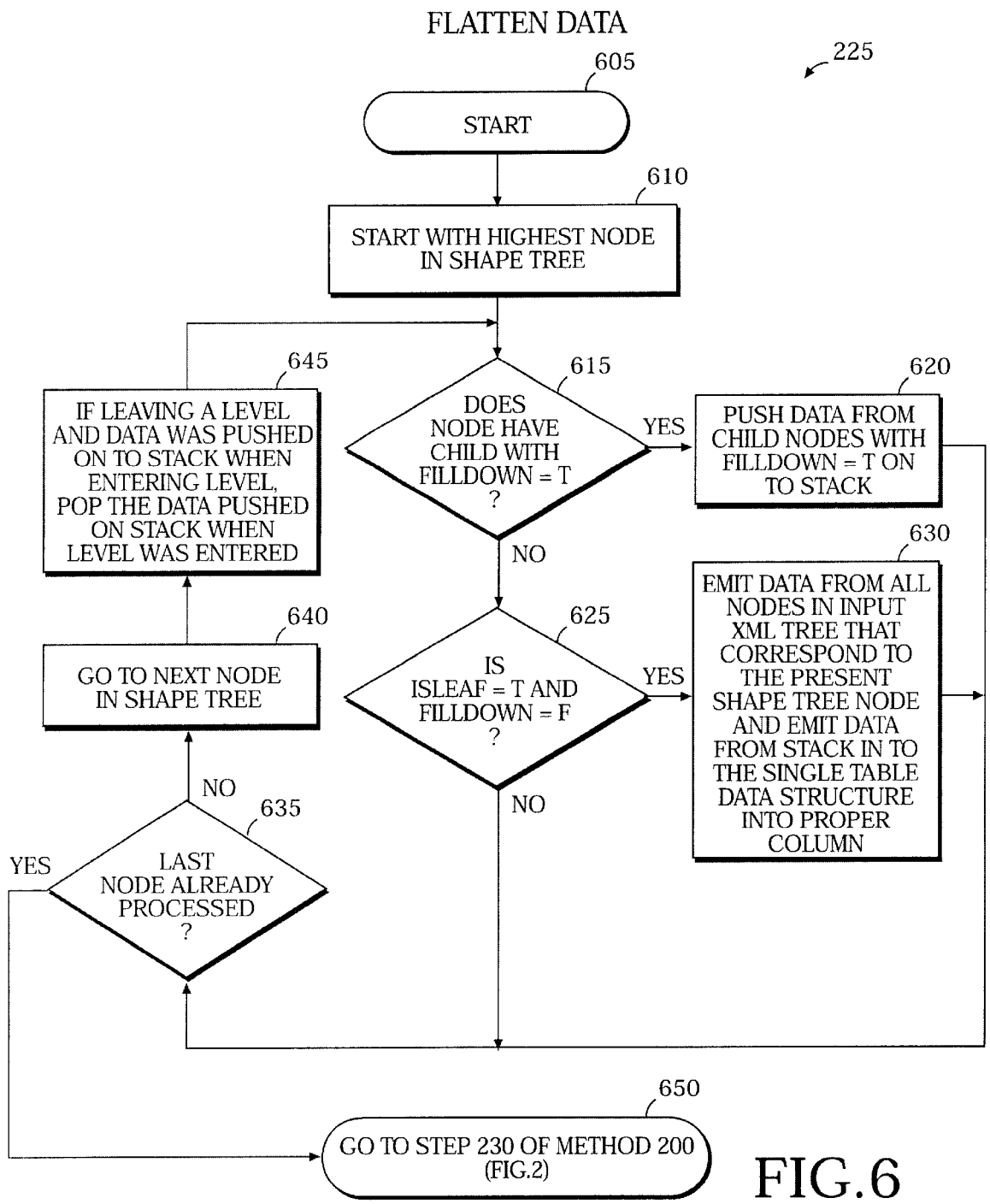
FIG. 6 is a flow chart that illustrates the flattening of the hierarchical data utilized in the exemplary embodiment of the present invention.

Exemplary method 200 continues to subroutine 225, where the actual flattening of the data contained in the input XML file 137 is performed. The steps of subroutine 225 are shown in FIG. 6 and will be described in greater detail below. And finally, exemplary method 200 proceeds from step 225 to step 230 where exemplary method 200 ends.

An Exemplary Method for Construction of the Shape Tree

FIG. 3, depicting the steps of exemplary subroutine 210 from FIG. 2 in which the shape tree of the input XML file is constructed. This method starts at step 305 and advances to step 310 where the input XML file 137 is read. Those skilled in the art will appreciate that XML is a widely recognized and accepted standard for the representation of electronic data. An example of an input XML file 137 is shown in FIG. 7.

Referring now to FIG. 7, line 705 indicates the base element "A" of the XML file structure. Proceeding through the input XML file 137 from top to bottom, the indented "<B>" at line 710 indicates that an element "B" is contained within the element "A" of line 705. The "b1" of line 710 represents the data contained within the element and the "</B>" following the "b1" signifies the end of this particular element. Similarly, lines 715 and 720 indicate two additional "B" elements containing data "b2" and "b3" respectively, also contained within the element "A".

Continuing through the input XML file 137 to line 725, the indented "<C>" with no following data indicates that an element "C" is contained within the element "A" and does not contain data. As indicated by the further indented elements in lines 730, 735 and 740, the elements contained within the "C" element of line 725 are, a "D" element containing the data "d1", an additional "D" element containing the data "D2", and an "E" element containing the data "e". The "</C>" of line 745 indicates the end of the "C" element begun in line 725.

Continuing to line 750, the "<F>" indicates an "F" element which is also contained within the "A" element of line 705 and has the numeric data "7.95" associated with it. Item 755 the indented "<C>" indicates an additional "C" element in contained within the "A" element. As shown by the indented "<D>" of line 760 which is indented further than the "<C>" of line 755, the element "C" of line 755 has an element "D" within it containing the data "D3". The "</C>" of line 765 closes the element "C" of line 745 and similarly, the "<A>" of line 770 closes the element "A" of line 705. Once an element is closed, no latter elements found subsequent in the file can be contained within the closed element. As demonstrated by the input XML file 137, XML is a very hierarchical data base format, which can include a multitude of data structures which in turn can contain data sub-structures, which in turn may contain other data sub-substructures.

Figure 8:
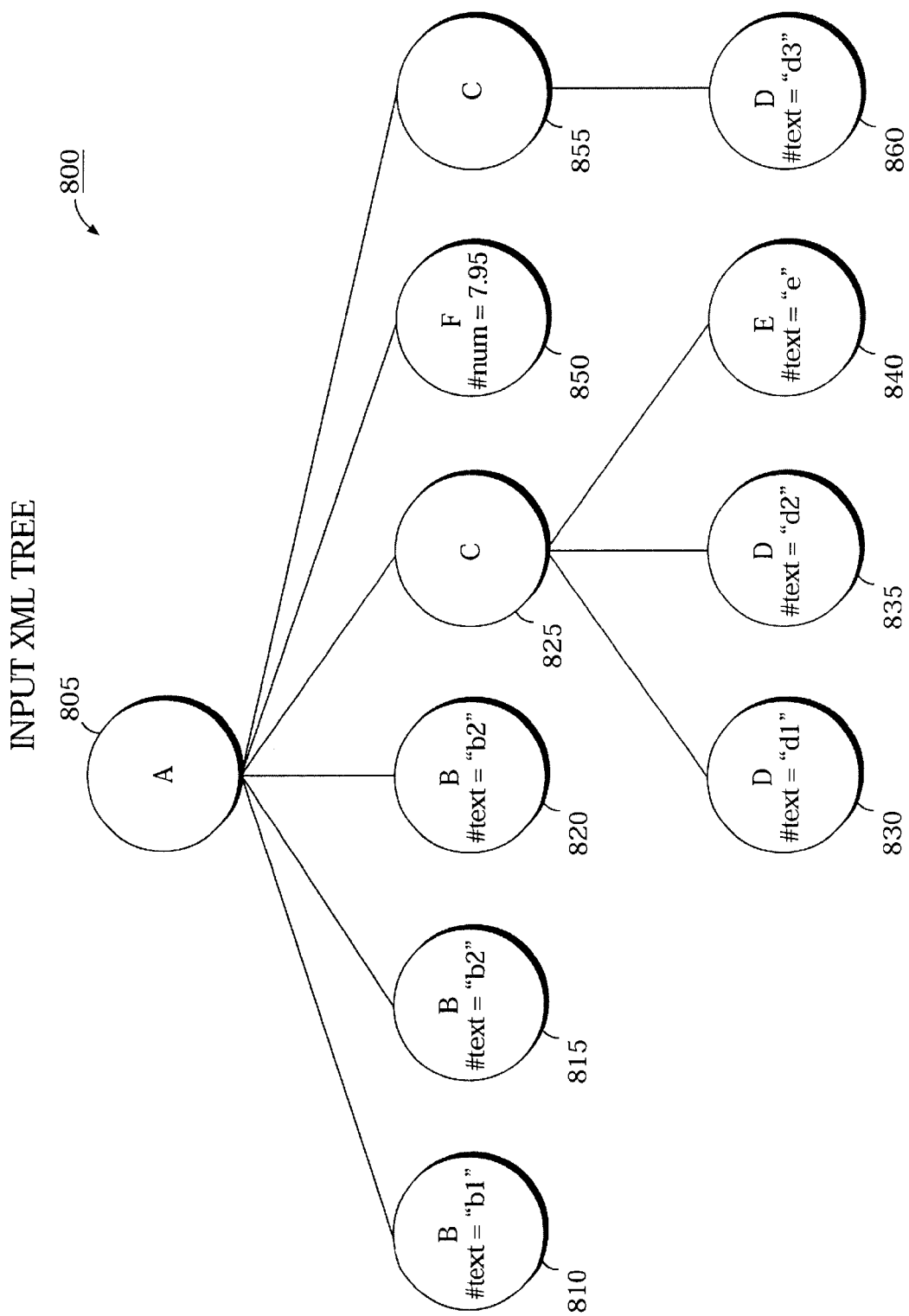
FIG. 8 is an abstract representation of the input XML tree of an exemplary embodiment of the present invention.

Referring back to FIG. 3, method 210 continues to step 315 where an input XML tree 800 is created. Generally, an input XML tree is a graphical representation of the data contained in an input XML file. FIG. 8 displays the input XML tree 800 for the data shown in the input XML file 137 of FIG. 7. Referring to FIG. 7 and FIG. 8, each circle within the input XML tree 800 is a node and corresponds to the elements contained in the input XML file 137. If lines in the input XML file 137 are indented further than a preceding line, then the element of the further indented lines will be represented as nodes attached to the node in the input XML tree 800 corresponding the preceding line.

For example, the element "A" of line 705 of the input XML file 137 corresponds to the base node "A" 805 of the input XML tree 800. Continuing through the input XML file 137, the indented elements of lines 710, 715, 720, 725, 750, and 755 below the "A" element of line 705, will be represented as nodes attached to the base "A" node 805. The aforementioned lines of the input WL file 137 correspond to the nodes 810, 815, 820, 825, 850, and 855 respectively of the input XML tree 800.

Still referring to FIG. 7 and FIG. 8, the indented lines 730, 735, and 740 below the "C" element of line 725 of the input XML file 137 will be represented as nodes attached to the "C" node 825 of the input XML tree 800. These nodes are 830, 835 and 840 respectively. Similarly, the line 760 indented below the "C" element line 755 of the input XML file 137 will be represented in the input XML tree 800 as node 860 attached to the "C" node 855.

Before the data can be flattened, it is important that the entire input tree be analyzed so that the data can be flattened consistently. In order to represent the data in a form that can be analyzed, an intermediate data structure called a shape tree is constructed. The shape tree is very similar to the input XML tree, except that there is only one unique node for each child at each level. A child node of a given node is any node appending from the given node. A parent node of a given node in question is the node at one level higher in the hierarchy from which the node in question appends. Redundant nodes at each level are not necessary because the shape tree is constructed to record the general structure of the input XML file 137 and not to contain data.

Figure 9:
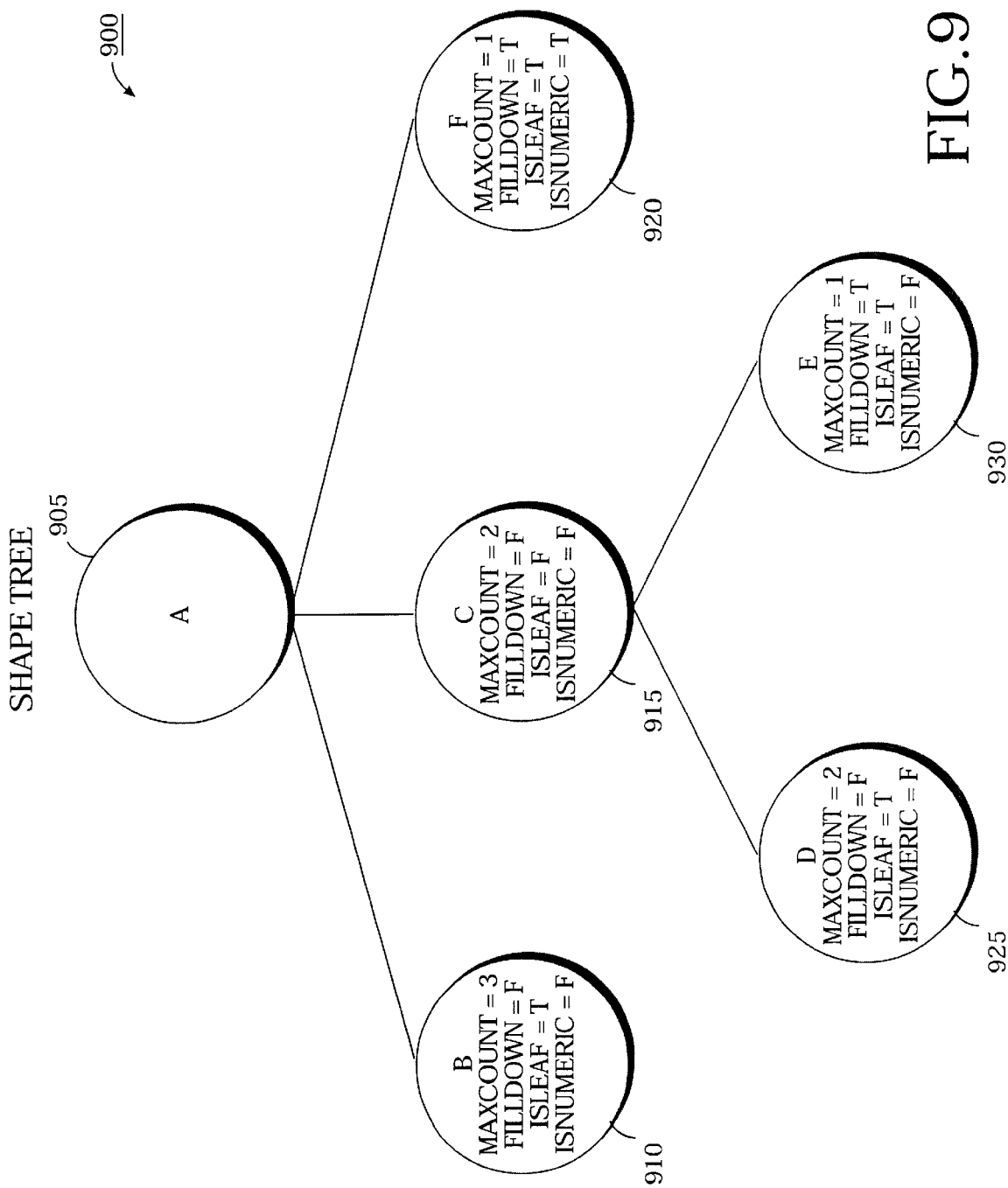
FIG. 9 is an abstract representation of the shape tree of an exemplary embodiment of the present invention.

Once the input XML tree 800 is created from the data of the input XML file 137, the input XML tree 800 is used to create a shape tree. The shape tree 900 corresponding to the input XML file 137, and input XML tree 800, is shown in FIG. 9. The creation of the shape tree begins with the general shape of the input XML tree 800. Next, nodes containing duplicate elements found in an input XML tree 800 are removed on a level-by-level basis effectively collapsing nodes of the input XML tree 800 containing redundant elements into one node. For example, three "B" nodes, 810, 815, and 820 are found at the first level below the node "A" 805 in the input XML tree 800 shown in FIG. 8. The corresponding entry into the shape tree 900 would include, however, only one "B" element represented by node 910 under the "A" node 905. Continuing with the example, a first "C" node 825 and a second node "C" 855 are found in the input XML tree 800. When incorporating these nodes into the shape tree 900, however, only one "C" node 915 is entered. Only one "F" node 850 is found under the "A" node 805, thus the corresponding "F" node 920 is reflected in the shape tree 900. Referring to the next level of the input XML tree 800, three "D" nodes 830, 835, and 860 are found under the "C" nodes 825 and 855. One "E" node 840 is found under "C" node 825. When reflecting this in the shape tree 900, the three "D" nodes 830, 835, and 860 are collapsed into one "D" node 925. The "E" node 840 is reflected into the shape tree 900 as "E" node 930. From step 320 the method proceeds to step 325 and returns to subroutine 215 of FIG. 2.

Annotate Properties on Shape Tree

FIG. 4 depicts the subroutine 215 of FIG. 2, whereby a shape tree constructed according to subroutine 210 is annotated with properties. These annotations provide information about the structure of the input XML file 137. Once the shape tree is constructed, both the input XML tree 800 and the shape tree 900 are simultaneously reviewed and the shape tree 900 is annotated. These annotations are important in performing a consistent flattening of the data because it allows data to be placed in the proper locations in the flat data structure 138. The annotations are summarized as follows:

MaxCount: This property specifies the maximum number of times a given element appears inside its parent node across the entire input tree. A parent node of a given node in question is the node at one level higher in the hierarchy from which the node in question appends.

FillDown: This is a true or false property determining whether a given node's contents are repeated for each row in the resulting table. If true, the data corresponding to true FillDown node is repeated for each row corresponding to a child node of a mutual parent of the flat data structure. FillDown is false when the current node's MaxCount>1, or when the current node has at least one child node whose FillDown property is false. A child node of a given node is any node appending from the given node.

IsLeaf: Is true if a node is a leaf node. A leaf node is one that has no child nodes and therefore contains data. If a node is not a leaf node, then it does not contain data.

IsNumeric: This property is true if and only if every occurrence of the node's element data contains numeric data. This property is used to determine if the element is intended to be numeric.

Subroutine 215 starts at step 405 and advances to step 410 where a node is selected to begin the annotation process. This process begins at the bottom of the shape tree and works up completing one level before advancing up to the next level because some node annotations are dependent on the annotations of their child nodes. Once a node is selected, the MaxCount for the node is set equal to the maximum number of times the node's element appears in the input XML tree 800 under its parent node. If the parent node from the shape tree 900 was created by collapsing several node from the input XML tree 800, each pre-collapsed node must be considered individually.

For example, if applied to the shape tree 900 of FIG. 9, this process can begin with the element "D" 925. Once this node is selected, a determination can be made as to how many times the element "D" appears under a parent "C" in the input XML tree 800 of FIG. 8. Because the parent "C" 915 of the shape tree 900 is the result collapsing the two "C" nodes 825 and 855 of the input XML tree 800, the two "C" nodes 825 and 855 must be considered individually. Appending from the "C" node 825 are the two "D" node 830 and 835 and appending from the "C" node 855 is the "D" node 860. Considering the two "C" nodes 825 and 855 individually, the "D" element appears a maximum of two times appending from the "C" node 825 and a maximum of one time from the "C" node 855. Accordingly, the MaxCount assigned to the "D" node 925 of shape tree 900 is 2, which is the maximum number of times a "D" node appeared under a "C" node in the input XML tree 800.

This process of determining the MaxCount is repeated for each node in the shape tree 900. For the "B" node 910, the MaxCount will be 3 since there are three "B" nodes 810, 815 and 820 that appear under the parent node "A" 805 of the input XML tree 800 which contains the "B" node. Likewise, there are two "C" nodes 825 and 855 that appear under the parent node "A". Accordingly, the "C" node 915 of the shape tree 900 will have a MaxCount of 2. With only one "F" node 850 in the input XML tree 800 under parent node 805, the MaxCount for the shape tree 900 "F" node 920 is 1. And finally, the "E" node 930 under the parent "C" node 915 will have a MaxCount of 1 since there is only one "E" node 840 under the "C" parent node 825 of the input XML tree 800.

Referring to FIG. 4, after the MaxCount for each node of the shape tree 900 has been determined, method 215 advances from step 415 to step 420 where the FillDown property is set for each node of the shape tree 900. The FillDown property is either "T" (true) or "F" (false). This property is set to "T" for each node in the shape tree 900 unless, 1) the MaxCount for the node is greater than 1 or 2) the node in question has at least one child node with a FillDown property set to "F". If either of the two preceding conditions are true, the FillDown property for the node is set to "F".

Applying the above to the shape tree 900, nodes 910, 915 and 925 will all have a FillDown property of "F" because each has a MaxCount of greater than 1. Nodes 920 and 930 have MaxCounts of 1, and neither has a child node with a FillDown equal to "F". Therefore, the FillDown properties of nodes 920 and 930 are both set to "T".

Once the FillDown property is set for the nodes of the shape tree 900 in step 420, the method continues to set 425 where the IsLeaf property is determined. IsLeaf is set to "T" (true) if the node has children nodes. However, if at least one child node appends from the node in question, the IsLeaf property is set to "F" (false). Applying this to the shape tree 900, nodes 910, 925, 930 and 920 have no child nodes, thus IsLeaf is "T" for each. Since node 915 has children appending, the IsLeaf property is set to "F" for node 915.

From step 425, method 215 advances to step 430 where the IsNumeric property is determined. IsNumeric is set to "T" if and only if all instances of the node in the input XML tree 800 contain numeric data. For example, all three nodes 810, 815 and 820 containing the "B" element in the input XML tree 800, contain alphanumeric data. Therefore, the IsNumeric property of the corresponding shape tree node 910 will be F. Similarly, the three "D" nodes 830, 835 and 860 contain alphanumeric data, thus the corresponding shape tree node 925 will have an IsNumeric property of "F". Since the "C" nodes 825 and 855 of the input XML tree 800 are parent nodes, they contain no data, thus node 915 of the shape tree 900 will have an IsNumeric property of "F". The "E" node 840 of the input XML tree 800 contains alphanumeric data as well, thus node 930 of the shape tree 900 will also have an IsNumeric property of "F". Finally, node 850 of the input XML tree 800 contains numeric data and is the only occurrence of the "F" element in the input XML tree 800. Therefore, node 920 of the shape tree 900 corresponding to the input XML tree node 850 will have an IsNumeric property of "T" since each and every occurrence of this node contains numeric data. With all node of the shape tree 900 annotated, method 215 advances from step 430 to step 435 and returns to subroutine 220 of FIG. 2.

Build List of Output Columns

FIG. 5, depicts subroutine 220 from FIG. 2, in which a list of the column names of the flat data structure 138 are built. Referring to FIG. 10, the flat data structure 138 comprises a matrix of cells organized into rows and columns. Each cell in the first row of cells 1005 of the flat data structure contains data which is the name of the column for which the cell lies. For example, the data "/A/B/#text" in column 1040, row 1005 is the name of column 1040. Likewise, all data in the subsequent cells of row 1005 contain data naming their respective column. The contents of the remaining cells of the flat data structure can contain actual data or are blank.

Method 220 starts at starting block 505 and advances to step 510, where a node with IsLeaf set to "T" in the shape tree 900 is selected. Once a node is selected at step 510, the method advances to step 515 where a column name corresponding to the node selected is built. In building the column name, "#text" is prepended with "/<element name of the present node>". From the present node, the shape tree is traced from child node to parent node until the highest node is reached. For each intermediate node between the selected node and the highest node, "/<element name of the node>" is prepended to the column name.

For example, if node 925 of the shape tree 900 was chosen initially, "/D/#text" would be the part of the column name produced from node 925. Advancing up the shape tree 900 to node 915, "/C" is prepended to the previous column name section "/D/#text" to produce "/C/D/#text". And finally, from node 915 the highest node 905 of the shape tree 900 is reached. Since the element name of node 905 is "A", an "/A" is prepended to "/C/D/#text" to produce the column name "/A/C/D/#text".

With the column name for node 925 of the shape tree built, method 220 advances from step 515 to step 520 where the column name is saved to the flat data structure 138 as the name for column 1050. From step 520, the method continues to step 525 to determine if a #agg column needs to be added to the flat data structure. With respect to the need of an #agg column, it is often the case that a number is meant to represent a single value across a number of child items that repeat. Because the data in the input XML file 137 is treated generically, it cannot be decided at this point what the proper usage will be for this data. Therefore, this type of data is flagged in the #agg column and the future user of the data can decide. For the node in question, if the IsNumeric and the FillDown properties are both true, an additional column name is saved. This new column name is similar to the one previously saved except the "#text" is replaced with "gagg". Applying this to node 925, because neither the IsNumeric or the FillDown properties are true, this additional column name is not created.

Still referring to FIG. 5, method 220 advance from step 525 to decision block 530 where it is determined if all nodes without children have been processed. If unprocessed nodes remain, the method advances from decision block 530 to step 510 and the previous process of selecting an unprocessed node, creating a column name corresponding to the selected node and saving the column name is repeated. Continuing with the previous example, with node 925 of the shape tree 900 processed, leaf nodes 910, 920, and 930 remain. Starting with each of these nodes and following them up the shape tree 900 to the root node 905, the following column names are produced respectively, "/A/B/#text, /A/F/#text", and "/A/C/E/#text". The root node is the highest node in the shape tree 900 and is distinguished by the fact that it has no parent node. These column names are saved to the flat data structure 138 as column 1040, 1060, and 1055 respectively. Also, during the creation of "/A/F#num" 1060, a corresponding column name "/A/F/#agg" 1065 is created because FillDown and IsNumeric are true.

If, however, at decision block 530 no unprocessed nodes without children remain in the shape tree 900, method 220 advances from decision block 530 to step 540 where "#id" column names are created if need be. During the construction of the shape tree 900, nodes with like elements under a parent node in the input XML tree 800 are collapsed together. The "#id" column may be necessary to distinguish between the data contained under the previously collapsed nodes. At this step each node in the shape tree 900 that has at least one child node is checked to see if the MaxCount is greater than 1 and if the node has at least one child node with FillDown set to false. If both of these conditions are true, for each node that satisfies these conditions, an additional column name is added to the flat data structure 138. The column name starts with "#id" and is prepended with "/<element name>" for each node passed as the shape tree 900 is traced from the node in question to the root node. Once this column name is created, it is saved to the flat data structure 138.

Referring to the shape tree 900, for example, the node 915 satisfies the conditions of having a Maxcount of greater than 1 and at least one child node with a FillDown set to "F". With both of these conditions true, the shape tree is traced from node 915 to the shape tree starting node of 905. During this trace, elements "C" and "A" are encountered, thus "/A" and "/C" are prepended to "#id" to create the column name "/A/C/#id". This column name is saved in the flat data structure 138 as column 1065 "/A/F/#agg". With all the column names built for the flat data structure 138, method 220 advances from step 540 to step 545 and returns to subroutine 225 of FIG. 2.

An Exemplary Method for Flattening Hierarchical Data

FIG. 6, depicts subroutine 225 from FIG. 2, where the data contained in the input XML tree 800 is placed in the flat data structure 138. Method 225 begins with starting block 605 and advances to step 610 where the root node in the shape tree 900 is selected. The root node is the highest node in the shape tree 900 and is distinguished by the fact that it has no parent node. Once the root node is selected, method 225 advances to step 615 where a determination is made as to whether the selected node has a child with the FillDown property set to "T". If this condition is met, method 225 advances to step 620. At this step the data from the node or nodes in the input XML tree 800 corresponding to the aforementioned node or nodes in the shape tree 900 with FillDown set to "T" is pushed onto a stack. A stack is a data stricture in which data is "pushed" or saved, and later "popped" or removed. In a stack type data structure, the data last pushed onto the stack is the data first popped, however, data may be emitted from the stack without popping the stack. From set 620 the method continues to step 635 where a determination is made as to whether all nodes in the shape tree have been processed. If all nodes have been processed, the method continues to step 650 and returns to subroutine 230 of FIG. 2. If, however, at decision block 635 it was determined that all nodes have not been processed, method 225 advances to step 640 where the next node in the shape tree 900 is selected.

After the next node is selected, method 225 advances from step 640 to step 645. At step 645, it is determined that if in tracing through the shape tree 900 in step 640 to determine the next node, was a node with IsLeaf set to false passed through. If this is true, any data pushed onto the stack when this node was first encountered should be popped from the stack.

From step 645, method 225 advances to decision block 615 where it is again determined if the selected node has a child node with its FillDown property set to true. If this condition is not met, the method continues to decision block 625 where it is determined if the IsLeaf property set to "T" and the FillDown property set to false on the selected node. If these conditions are not met, the method advances to decision block 635 where a determination is made as to whether the last node has been processed. However, if at decision block 625 the aforementioned conditions were met, the method advances to step 630.

At step 630 the data contained in the input XML tree 800 node or nodes corresponding to the selected shape tree 900 node is emitted to the proper column or columns of the flat data structure 138. The proper column is a column whose column name corresponds to the node in the input XML tree 800 from which the data came. Data from each input XML tree 800 node is entered into a separate row of the flat data structure 138 along with the contents of the stack. Once the data has been emitted to the flat data structure, method 225 advances to step 635 to determine if all nodes of the shape tree 900 have been processed. If this condition is not true, the method continues to step 640 and the next node is selected. However, if at decision block 635 it was determined that all nodes of the shape tree 900 have been processed, then the method continues to step 650 and ends at step 230 of method 200 shown in FIG. 2.

In view of the foregoing, it will be appreciated that the present invention provides a method and system for the conversion of highly hierarchical data structures into less hierarchical data structures. Still, it should be understood that the foregoing relates only to the exemplary embodiments of the present invention, and that numerous changes may be made thereto without departing from the spirit and scope of the invention as defined by the following claims.

We claim:

1. In a computer system, a method for converting a hierarchical data structure into a flat data structure comprising the steps of:

a) converting said hierarchical data structure into an input data tree comprising nodes, said nodes containing the data elements of said hierarchical data structure and said nodes linked together in a parent-child relationship, said parent-child relationship derived from the hierarchical data structure;

b) constructing a shape tree corresponding to the input data tree by collapsing nodes of said input data tree containing redundant elements into one node;

c) annotating said shape tree nodes with properties describing the hierarchical relationships between elements of the input data tree;

d) building a list of column names for said flat data structure deriving said column names by tracing said shape tree; and e) emitting data from said input data tree into proper columns and row of said flat data structure.

2. The method in claim 1, wherein said properties include a first property specifying the maximum number of times a given element appears inside its parent across the entire input tree.

3. The method in claim 1, wherein said properties include a first property specifying the maximum number of times a given element appears inside its parent across the entire input tree and a second property set equal to false if and only if the node's first property is greater than zero or if the node has any child nodes that have a second property set to false.

4. The method in claim 1, wherein said properties include a third property set to true if the node has any child nodes.

5. The method in claim 1, wherein said properties include a fourth property set to true if and only if every occurrence of the element corresponding to the node contains numeric data.

6. The method in claim 1, wherein the format of the data structure of said hierarchical data structure is XML.

7. The method in claim 1, wherein said flat data structure is readily usable by an electronic spreadsheet.

8. The method in claim 1, wherein: said properties include;

a first property specifying the maximum number of times a given element appears inside its parent across the entire input tree, a second property set equal to false if and only if the node's first property is greater than zero or if the node has any child nodes and anyone of said child nodes have a second property set to false, and a third property set to true if every occurrence of the element corresponding to the node contains numeric data; and wherein a column name is generated for said flat data structure when said second and said third properties are both true.

9. The method in claim 1, wherein: said properties include;

a first property specifying the maximum number of times a given element appears inside its parent across the entire input tree, and a second property set equal to false if and only if the node's first property is greater than zero or if the node has any child nodes that have a second property set to false; and wherein a column name is generated for said flat data structure when said first and said second properties are both true.

10. A computer system for converting a hierarchical data structure into a flat data structure, the system comprising:
   a memory for storing said hierarchical data structure and said flat data structure; and
   a processing unit functionally coupled to the memory, for executing computer-executable instructions operable for:
      converting said hierarchical data structure into an input data tree comprising nodes, said nodes containing the data elements of said hierarchical data structure and said nodes link together in a parent-child relationship in the same fashion as the data elements they contain were linked in the hierarchical data structure,
      constructing a shape tree corresponding to the input data tree by collapsing nodes of said input data tree containing redundant elements into one node, said intermediate data structure retaining the same parent-child relationship of the input data tree,
      annotating said shape tree nodes with properties describing the hierarchical relationships between elements of the input data tree,
      building a list of column names for said flat data structure utilizing said intermediate data structure as annotated, and
      emitting data from said input data tree into proper columns and row of said flat data structure.

11. The system in claim 10, wherein said properties include a first property specifying the maximum number of times a given element appears inside its parent across the entire input tree.

12. The system in claim 10, wherein said properties include a first property specifying the maximum number of times a given element appears inside its parent across the entire input tree and a second property set equal to false if and only if the node's first property is greater than zero or if the node has any child nodes that have a second property set to false.

13. The system in claim 10, wherein said properties include a third property set to true if the node has any child nodes.

14. The system in claim 10, wherein said properties include a fourth property set to true if and only if every occurrence of the element corresponding to the node contains numeric data.

15. The system in claim 10, wherein the format of the data structure of said hierarchical data structure is XML.

16. The system in claim 10, wherein said flat data structure is readily usable by an electronic spreadsheet.

17. The system in claim 10, wherein: said properties include;
   a first property specifying the maximum number of times a given element appears inside its parent across the entire input tree,
   a second property set equal to false if and only if the node's first property is greater than zero or if the node has any child nodes and anyone of said child nodes have a second property set to false, and
   a third property set to true if every occurrence of the element corresponding to the node contains numeric data; and
   wherein a column name is generated for said flat data structure when said second and said third properties are both true.

18. The system in claim 10, wherein: said properties include;
   a first property specifying the maximum number of times a given element appears inside its parent across the entire input tree, and
   a second property set equal to false if and only if the node's first property is greater than zero or if the node has any child nodes that have a second property set to false; and
   wherein a column name is generated for said flat data structure when said first and said second properties are both true.

* * * * *

UNITED STATES PATENT AND TRADEMARK OFFICE
CERTIFICATE OF CORRECTION

PATENT NO. : 6,502,101 B1  
DATED : December 31, 2002  
INVENTOR(S) : Verprauskus et al.

It is certified that error appears in the above-identified patent and that said Letters Patent is hereby corrected as shown below:

Column 2,  
Line 19, "anyone" should read -- any one --

Column 6,  
Line 55, "WL" should read -- XML --

Column 10,  
Line 59, "IC" should read -- /C --

Column 12,  
Line 51, "anyone" should read -- any one --

Column 14,  
Line 20, "anyone" should read -- any one --

Signed and Sealed this

Eighth Day of July, 2003

JAMES E. ROGAN  
*Director of the United States Patent and Trademark Office*